United States Patent
Wang

(10) Patent No.: US 6,546,835 B2
(45) Date of Patent: Apr. 15, 2003

(54) SAW BLADE ADJUSTING DEVICE FOR TABLE SAW

(76) Inventor: Tian Wang Wang, No. 45, Yi Chang East Road, Taiping City, Taichung Hsien (TW), 411

( * ) Notice: Subject to any disclaimer, the term of this patent is extended or adjusted under 35 U.S.C. 154(b) by 86 days.

(21) Appl. No.: 09/768,718

(22) Filed: Jan. 25, 2001

(65) Prior Publication Data

US 2002/0096030 A1 Jul. 25, 2002

(51) Int. Cl.$^7$ ................................................. B26D 1/14
(52) U.S. Cl. ...................................... 83/477.1; 83/477.2
(58) Field of Search ............................... 83/477.1, 477.2

(56) References Cited

U.S. PATENT DOCUMENTS

| | | | | |
|---|---|---|---|---|
| 146,886 A | * | 1/1874 | Doane et al. ............... | 83/477.1 |
| 160,350 A | * | 3/1875 | Rice et al. .................. | 83/477.1 |
| 2,106,288 A | * | 1/1938 | Tautz ........................... | 83/438 |
| 2,344,502 A | * | 3/1944 | Boice .......................... | 83/477.1 |
| 2,852,047 A | * | 9/1958 | Odlum et al. ................. | 83/473 |
| 2,913,025 A | * | 11/1959 | Richards ....................... | 144/1.1 |
| 3,356,111 A | * | 12/1967 | Mitchell ....................... | 83/171 |
| 3,581,784 A | * | 6/1971 | Warrick et al. ............. | 83/477.1 |
| 4,249,442 A | * | 2/1981 | Fittery .......................... | 144/130 |
| 4,276,799 A | * | 7/1981 | Muehling ..................... | 83/473 |
| 4,367,665 A | * | 1/1983 | Terpstra et al. ............... | 83/100 |
| 4,599,927 A | * | 7/1986 | Eccardt et al. ................ | 83/473 |

* cited by examiner

Primary Examiner—Allan N. Shoap
Assistant Examiner—Isaac Hamilton
(74) Attorney, Agent, or Firm—Charles E. Baxley

(57) ABSTRACT

A table saw includes a table disposed on a housing, a plate supported in the housing, a follower rotatably secured to the plate with a pivot axle, a saw blade rotatably secured to the follower with a pole and rotated in concert wit.h the follower relative to the plate. A motor is coupled to the pole, with a pulley-and-belt coupling or the like, for driving the saw blade via the pole. A threaded shaft is engaged with a gear sector of the follower for rotating the follower relative to the plate and for moving the saw blade upward and downward relative to the table.

4 Claims, 6 Drawing Sheets

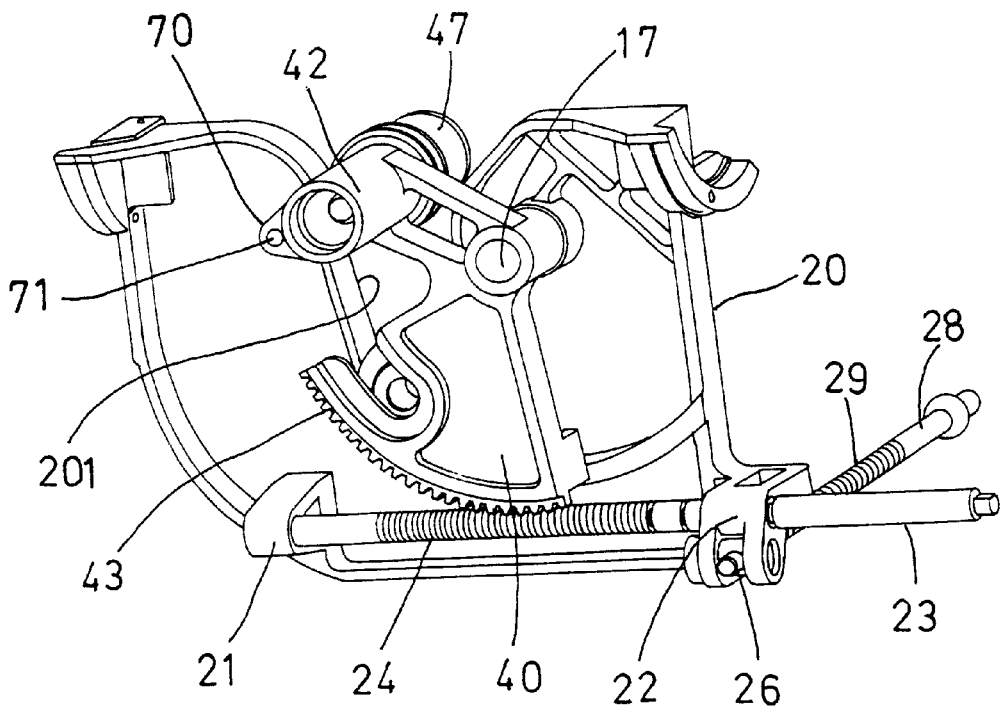
FIG. 7
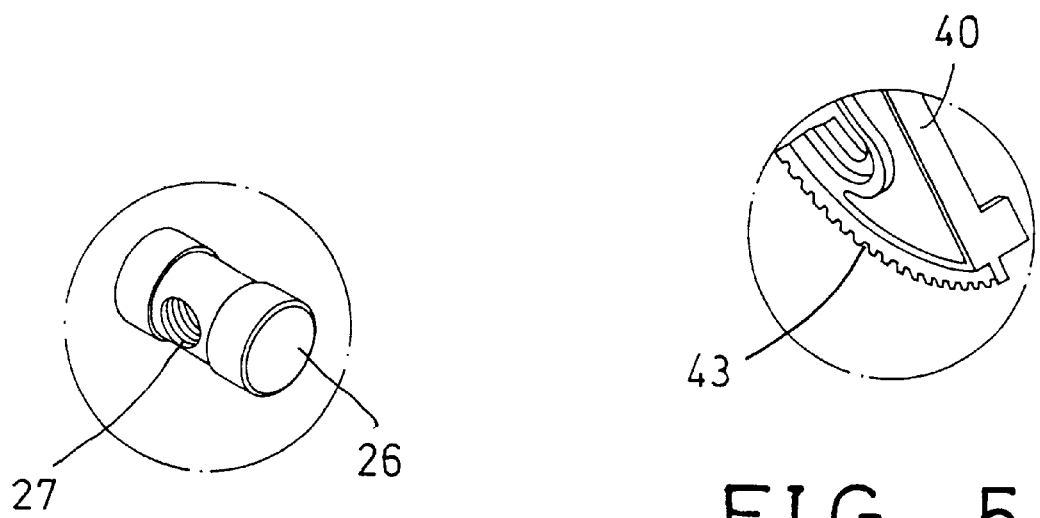
FIG. 6
FIG. 5

SAW BLADE ADJUSTING DEVICE FOR TABLE SAW

BACKGROUND OF THE INVENTION

1. Field of the Invention

The present invention relates to a table saw, and more particularly to a table saw having a saw blade adjusting device for adjusting or moving the saw blade inward and outward of the table or the platform of the table saw.

2. Description of the Prior Art

Typical table saws comprise a housing disposed above a base and having a table or a platform provided on top thereof. A saw blade is rotatably received in the housing and slightly extended upward through the table for cutting the work pieces supported or moved along the table. The saw blade may not be adjusted or moved upward and downward relative to the table.

The present invention has arisen to mitigate and/or obviate the afore-described disadvantages of the conventional table saws.

SUMMARY OF THE INVENTION

The primary objective of the present invention is to provide a table saw including a saw blade adjusting device for adjusting or moving the saw blade inward and outward of the table or the platform of the table saw.

In accordance with one aspect of the invention, there is provided a table saw comprising a housing including a table provided on top thereof, a plate supported in the housing, a follower rotatably secured to the plate with a pivot axle, a saw blade rotatably secured to the follower with a pole and rotated in concert with the follower relative to the plate, means for driving the pole to rotate and to drive the saw blade, and means for rotating the follower relative to the plate about the pivot axle to move the saw blade upward and downward relative to the table.

The pole driving means includes a motor secured to the follower and having a spindle, and means for coupling the spindle to the pole. The motor is secured to the follower and rotated in concert with the follower relative to the plate about the pivot axle, such that the driven of the saw blade by the motor will not be affected when the follower and thus the motor are rotated and adjusted relative to the plate.

The coupling means includes a first pulley secured on the pole and rotated in concert with the pole, a second pulley secured on the spindle and rotated in concert with the spindle, and a belt engaged around the first and the second pulleys. The coupling means may also be a sprocket-and-chain coupling device, or a gear coupling device, or the like.

The motor includes a panel extended therefrom and having a curved groove formed therein, a fastener engaged through the curved groove of the panel and secured to the follower for adjustably securing the motor to the follower at a selected angular position after the fastener belt is tightened and solidly engaged on the pulleys.

The follower includes a channel formed therein for receiving the spindle of the motor. The plate includes a cavity formed therein for receiving the spindle of the motor.

The follower rotating means includes a sector gear formed in the follower, a shaft rotatably secured to the plate and having a threaded portion engaged with the sector gear of the follower in order to rotate the follower relative to the plate when the shaft is rotated relative to the plate.

Further objectives and advantages of the present invention will become apparent from a careful reading of a detailed description provided hereinbelow, with appropriate reference to accompanying drawings.

BRIEF DESCRIPTION OF THE DRAWINGS

FIG. 5 is a partial perspective view of a follower;

FIG. 6 is a perspective view of an adjusting rod;

FIG. 7 is a partial perspective view of the saw blade adjusting device; and

DETAILED DESCRIPTION OF THE PREFERRED EMBODIMENT

Figure 1:
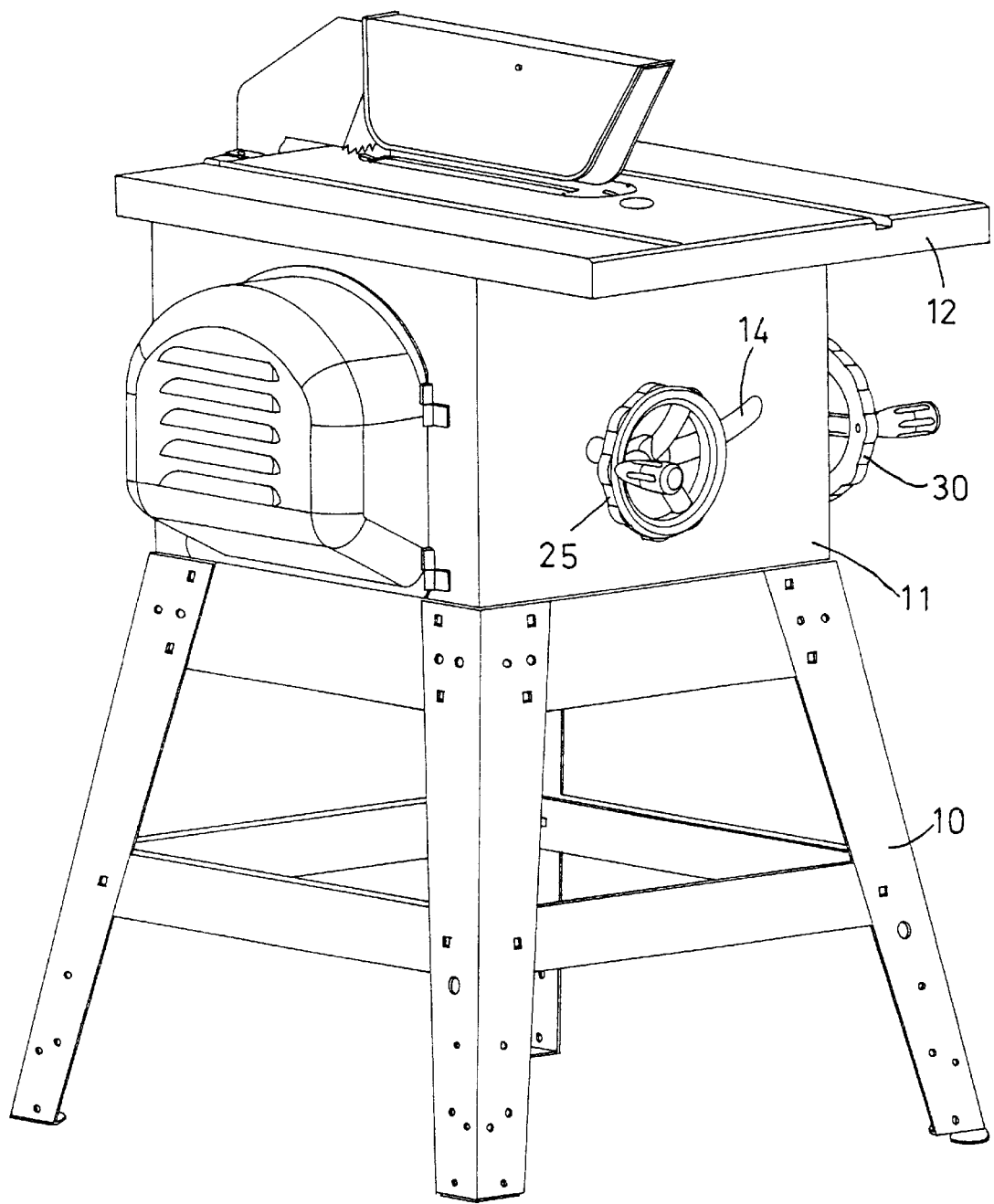
FIG. 1 is a front perspective view of a table saw having a saw blade adjusting device in accordance with the present invention.
Figure 2:
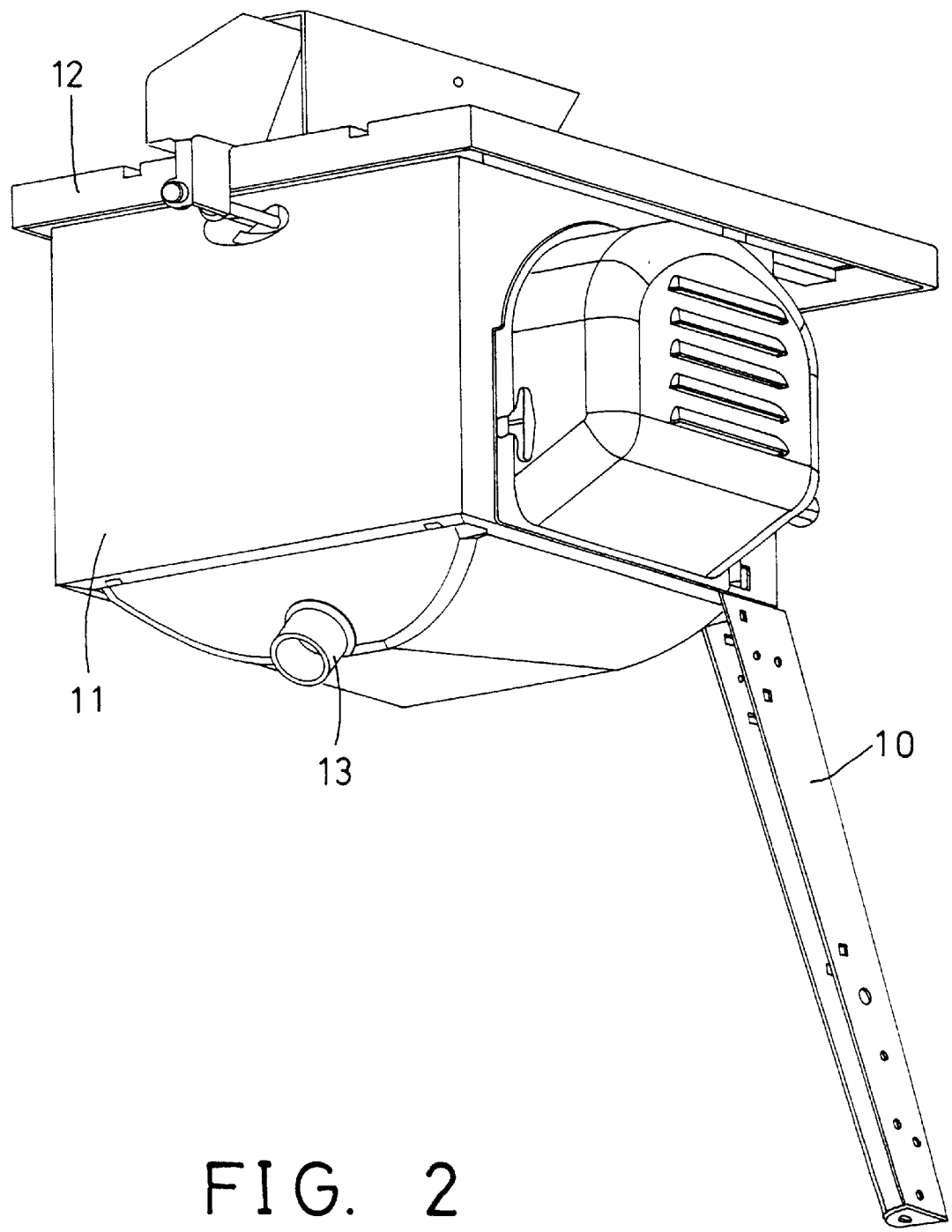
FIG. 2 is a partial rear perspective view of the table saw.
Figure 3:
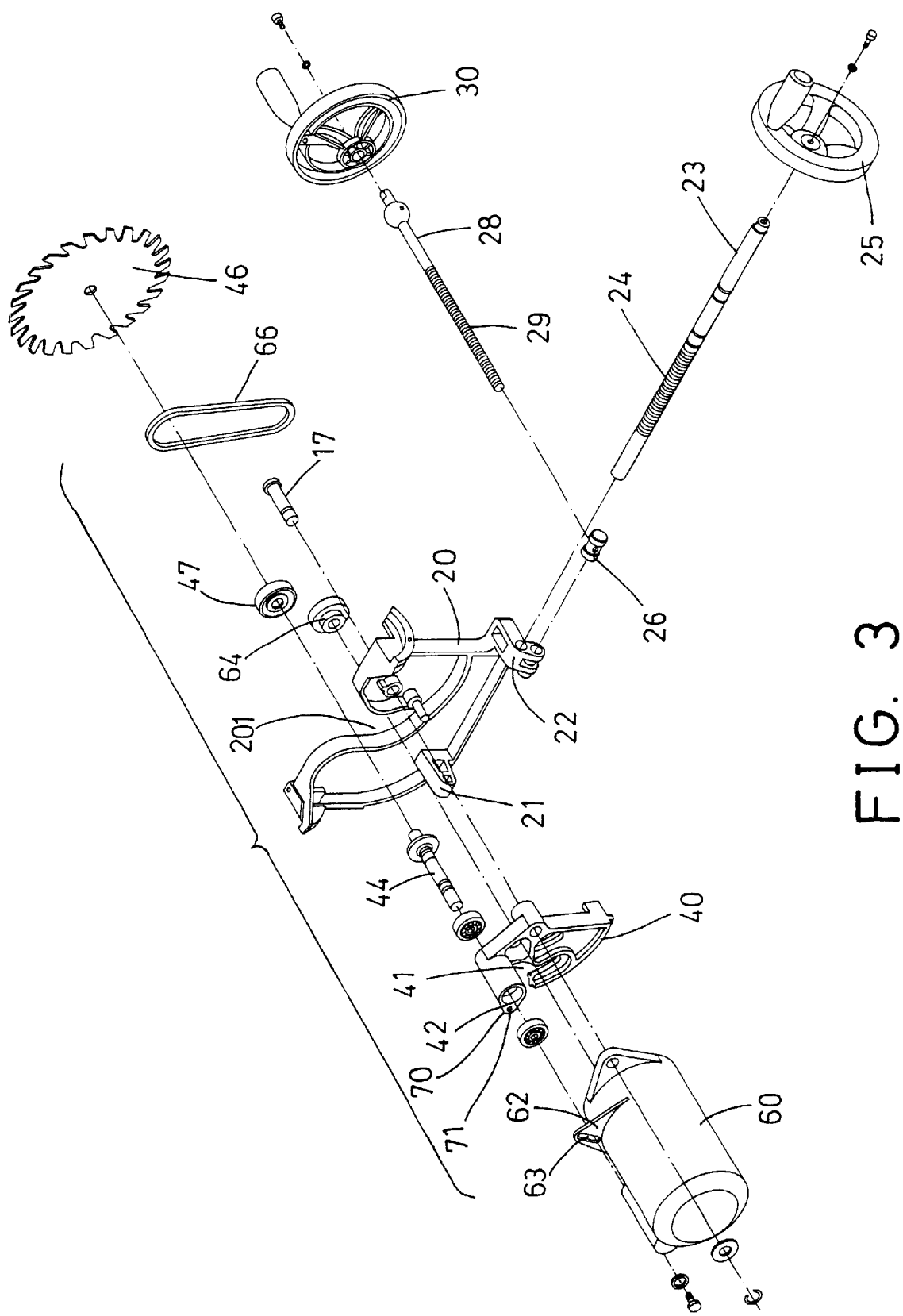
FIG. 3 is a partial exploded view viewing from the front portion of the table saw, for illustrating the saw blade adjusting device.
Figure 4:
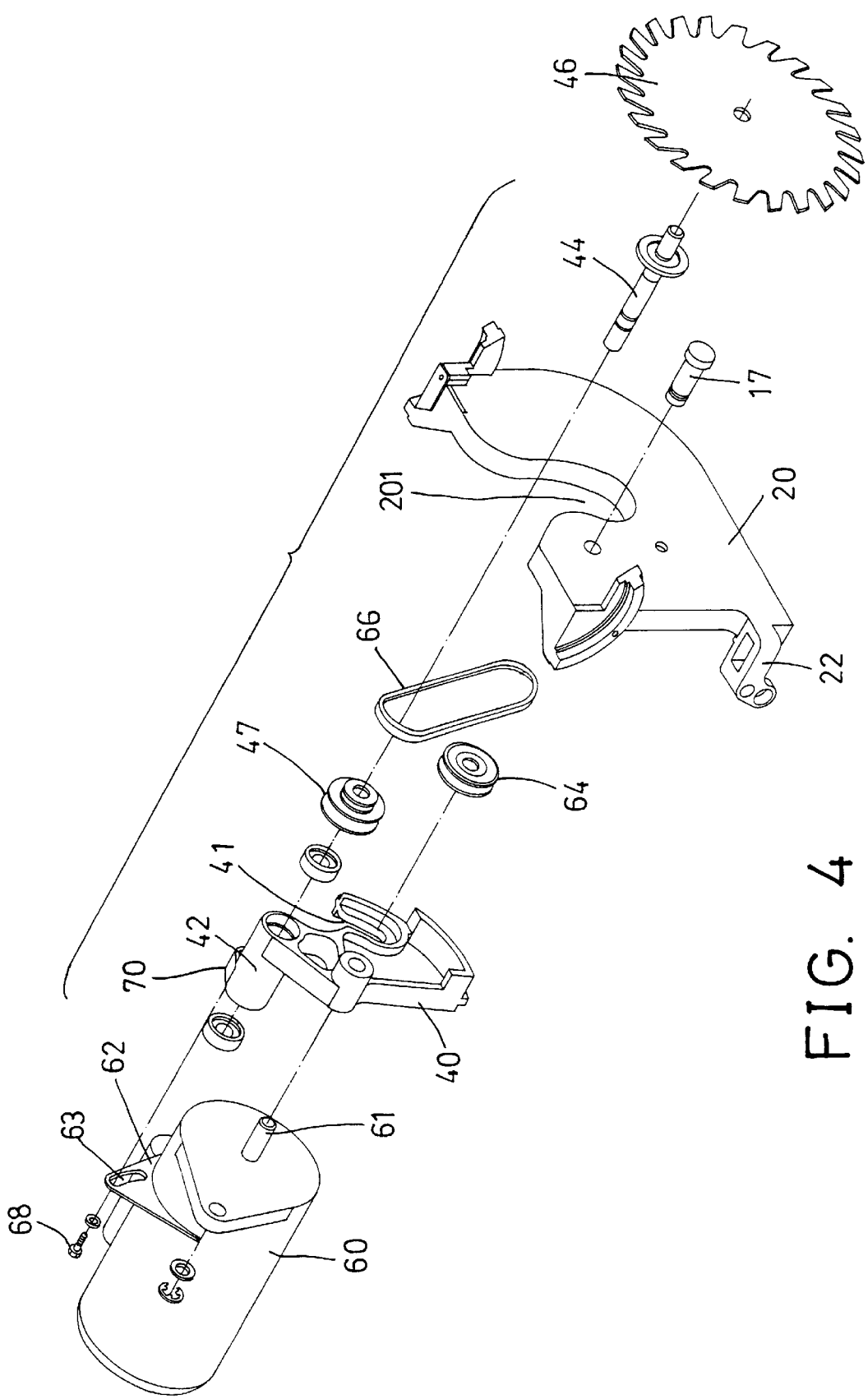
FIG. 4 is a partial exploded view viewing from the direction opposite to that shown in FIG. 3, for illustrating the saw blade adjusting device.

Referring to the drawings, and initially to FIGS. 1 and 2, a table saw in accordance with the present invention comprises a housing 11 disposed on a base 10, and a table 12 disposed above the housing 11. The housing 11 includes a port 13 formed in the bottom thereof and coupled to a vacuum device for drawing the dirt and dust out of the housing 11. The housing 11 includes a curved slot 14 formed in one of the side portions of the housing 11.

Referring next to FIGS. 3–7 and again to FIGS. 1 and 2, a plate 20 is supported in the housing 11 and includes two ears 21, 22 extended therefrom. A shaft 23 is rotatably secured in the ears 21, 22 and slidably received in the curved slot 14 of the housing 10, and includes an outer thread or a worm or a threaded portion 24 formed thereon and includes a handle 25 attached thereto for rotating the shaft 23. A rod 26 is rotatably secured in the ear 22 and includes a screw hole 27 formed therein. Another shaft 28 includes an outer thread 29 formed thereon for threading with the screw hole 27 of the rod 26 and includes a handle 30 attached thereto for rotating the shaft 28 and for adjusting the plate 20 relative to the housing 11. The support and the adjusting of the plate 20 relative to the housing 11 is not related to the present invention and will not be described in further details.

The plate 20 includes a cavity 201 formed therein and preferably facing upward. A follower 40 and a motor 60 may be rotatably secured to the plate 20 with a pivot axle 17, such that the follower 40 and the motor 60 may be rotated relative to the plate 20. The follower 40 includes a channel 41 formed therein, and includes a tube 42 provided thereon and substantially perpendicular to the follower 40, and includes a sector gear 43 formed or provided on the bottom thereof. The motor 60 includes a spindle 61, and a panel 62 extended therefrom and having a through hole 63 formed therein. A fastener 68 is secured to the tube 42 and slidably or adjustably engaged in the through hole 63 of the panel 62 for adjustably securing the follower 40 to the motor 60 at the required angular position. The tube 42 includes a bracket 70 extending therefrom and having a circular opening 71 therein. The through hole 63 is connected to the circular opening 71 by fastener 68.

A pole 44 is rotatably secured in the tube 42 of the follower 40, a pulley 47 and a saw blade 46 are secured on the pole 44 and rotated in concert with the pole 44. Another pulley 64 is secured to the spindle 61 of the motor 60 so as to be driven and rotated by the motor 60. A belt 66 is engaged around the pulleys 64, 47 for coupling the pole 44 to the motor 60 and for allowing the saw blade 46 to be rotated by the motor 60. The spindle 61 of the motor 60 may be slidably received in the channel 41 of the follower 40 and the cavity 201 of the plate 20, such that the driving of the motor 60 to the saw blade 46 will not be affected by the plate 20. The fastener 68 may be adjusted and secured relative to the panel 62 of the motor 60 after the belt 66 is tightened and solidly engaged on the pulleys 47, 64. The pole 44 may also be coupled to the spindle 61 of the motor 60 with sprocket-and-chain coupling device, or with gear coupling device.

Figure 8:
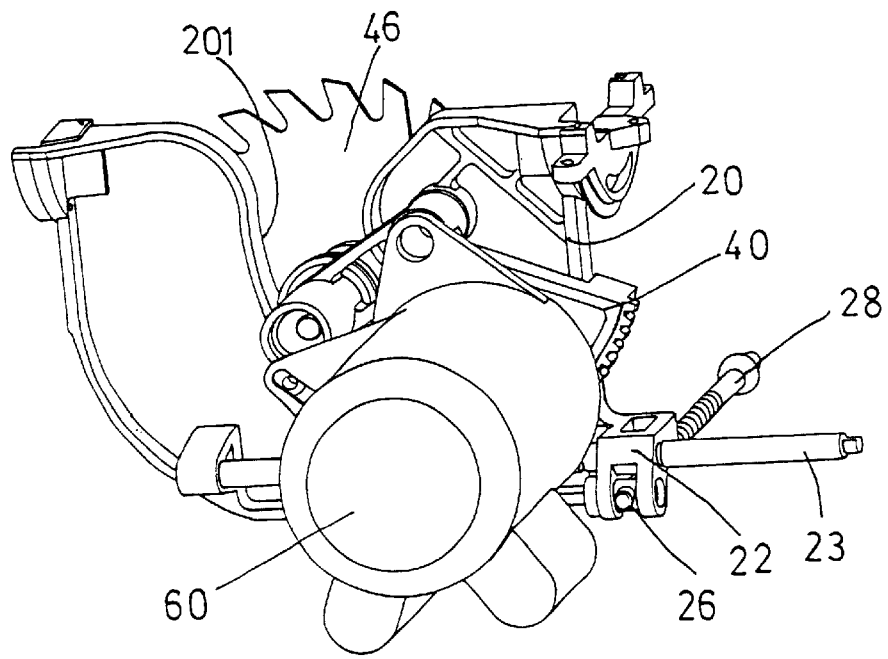
FIGS. 8 and 9 are partial perspective views similar to FIG. 7, illustrating the operation of the saw blade adjusting device for the table saw.
Figure 9:
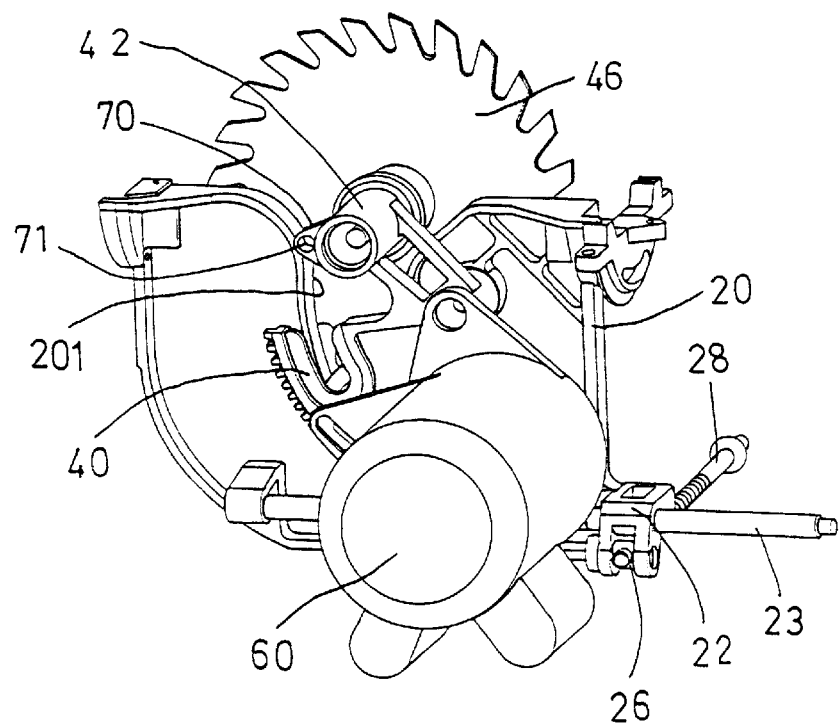

As shown in FIG. 7, the outer thread 24 of the shaft 23 is threaded or engaged with the sector gear 43 of the follower 40 such that the follower 40 and thus the saw blade 46 may be rotated relative to the plate about the pivot axle 17, and such that the saw blade 46 may be moved upward and downward relative to the plate 20 and thus relative to the table 12, best shown in FIGS. 8 and 9.

The motor 60 is secured to the follower 40 with the fastener 68 such that the motor 60 may be rotated in concert with the follower 40 relative to the plate 20 when the follower 40 is rotated relative to the plate 20 by the engagement of the shaft 23 with the sector gear 43, and such that the driving of the motor 60 to the saw blade 46 will not be affected when the follower 40 is rotated relative to the plate 20. The saw blade 46 may thus be easily moved upward and downward relative to the table 12 by the rotation of the follower 40 relative to the plate 20.

Accordingly, the table saw in accordance with the present invention includes a saw blade adjusting device for adjusting or moving the saw blade inward and outward of the table or the platform of the table saw.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A table saw comprising:

a) a housing including a table provided on top thereof, b) a plate supported in said housing, c) a follower rotatably secured to said plate with a pivot axle, d) a saw blade rotatably secured to said follower with a pole and rotated in concert with said follower relative to said plate, e) a first pulley secured on said pole and rotated in concert with said pole, f) a motor secured to said follower and including a spindle, and including a panel extended therefrom and having a through hole formed therein, g) a fastener engaged through said through hole of said panel and secured to said follower for adjustably securing said motor to said follower at any selected angular position, h) a second pulley secured on said spindle of said motor and rotated in concert with said spindle of said motor, i) a belt engaged around said first and said second pulleys, and j) means for rotating said follower relative to said plate about said pivot axle to move said saw blade upward and downward relative to said table, k) said follower including a tube with a central longitudinal axis, l) said central longitudinal axis of said tube being co-linear with the axis of rotation of said blade, m) said tube including a bracket extending radially therefrom and having a circular opening, n) said circular opening and said through hole secured together with a fastener, o) the central longitudinal axis of said through hole and said axis of rotation of said blade being parallel.

2. The table saw according to claim 1, wherein said follower includes a channel formed therein for receiving said spindle of said motor.

3. The table saw according to claim 1, wherein said plate includes a cavity formed therein for receiving said spindle of said motor.

4. The table saw according to claim 1, wherein said follower rotating means includes a sector gear formed in said follower, a shaft rotatably secured to said plate and having a threaded portion engaged with said sector gear of said follower in order to rotate said follower relative to said plate when said shaft is rotated relative to said plate.

* * * * *